(12) United States Patent
Gerovac et al.

(10) Patent No.: US 9,176,779 B2
(45) Date of Patent: *Nov. 3, 2015

(54) DATA ACCESS IN DISTRIBUTED SYSTEMS

(75) Inventors: Branko J. Gerovac, Lexington, MA (US); David C. Carver, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 12/170,685

(22) Filed: Jul. 10, 2008

(65) Prior Publication Data

US 2010/0010999 A1    Jan. 14, 2010

(51) Int. Cl.
*G06F 17/30* (2006.01)
*G06F 9/50* (2006.01)
*H04L 29/08* (2006.01)

(52) U.S. Cl.
CPC .............. *G06F 9/5011* (2013.01); *H04L 67/06* (2013.01)

(58) Field of Classification Search
CPC ............ H04L 67/1002; H04L 67/1008; H04L 67/1095; H04L 65/4084; H04L 67/1012; H04L 67/1097; H04N 21/23103; H04N 21/47202; H04N 21/2312; H04N 21/232; H04N 21/262; G06F 17/30194; G06F 17/30215; G06F 17/30781
USPC ........... 709/226, 233; 707/694, 705, 770, 812
See application file for complete search history.

(56) References Cited

U.S. PATENT DOCUMENTS

| | | | |
|---|---|---|---|
| 3,746,780 A | 7/1973 | Stetten et al. |
| 3,851,104 A | 11/1974 | Willard et al. |
| 4,845,658 A | 7/1989 | Gifford |
| 5,132,992 A | 7/1992 | Yurt et al. |
| 5,581,552 A | 12/1996 | Civanlar et al. |
| 5,581,784 A | 12/1996 | Tobagi et al. |
| 5,583,995 A | 12/1996 | Gardner et al. |
| 5,608,448 A | 3/1997 | Smoral et al. |
| 5,640,563 A | 6/1997 | Carmon |
| 5,787,482 A | 7/1998 | Chen et al. |

(Continued)

FOREIGN PATENT DOCUMENTS

| | | |
|---|---|---|
| WO | WO 2008/137334 | 11/2008 |
| WO | WO 2010/006127 | 1/2010 |

(Continued)

OTHER PUBLICATIONS

PCT International Preliminary Report of Patentability, date mailed Nov. 19, 2009, for PCT/US2008/061401.

(Continued)

*Primary Examiner* — Dennis Truong
(74) *Attorney, Agent, or Firm* — Harrity & Harrity, LLP

(57) ABSTRACT

Methods, systems, and apparatus, including computer program products for receiving a request for access to a first item of content stored on resources of a storage environment, the request for access being initiated by a first user, identifying an existing resource allocation arrangement associating elements of the first item of content with respective elements of the resources of the storage environment, performing an inquiry to determine whether an admission condition is satisfied, and upon satisfaction of the admission condition, generating a specification of an access operation, the access operation configured to enable a selected set of elements among the respective elements of the resources of the storage environment to be accessed.

25 Claims, 6 Drawing Sheets

(56) References Cited

U.S. PATENT DOCUMENTS

| | | | |
|---|---|---|---|
| 5,805,804 | A | 9/1998 | Laursen et al. |
| 5,862,312 | A | 1/1999 | Mann et al. |
| 5,926,649 | A | 7/1999 | Ma et al. |
| 6,230,200 | B1 | 5/2001 | Forecast et al. |
| 6,374,336 | B1 * | 4/2002 | Peters et al. ............ 711/167 |
| 6,401,126 | B1 | 6/2002 | Douceur et al. |
| 6,609,149 | B1 | 8/2003 | Bandera et al. |
| 7,000,072 | B1 * | 2/2006 | Aisaka et al. ............ 711/118 |
| 7,058,947 | B1 | 6/2006 | Raja et al. |
| 7,277,978 | B2 | 10/2007 | Khatami et al. |
| 7,369,555 | B2 * | 5/2008 | Jarl ......................... 370/392 |
| 2002/0049846 | A1 * | 4/2002 | Horen et al. ............. 709/226 |
| 2003/0005457 | A1 * | 1/2003 | Faibish et al. ............... 725/94 |
| 2003/0026262 | A1 * | 2/2003 | Jarl ......................... 370/394 |
| 2003/0140051 | A1 * | 7/2003 | Fujiwara et al. .......... 707/100 |
| 2003/0195948 | A1 | 10/2003 | Takao et al. |
| 2004/0103437 | A1 | 5/2004 | Allegrezza et al. |
| 2004/0198386 | A1 | 10/2004 | Dupray |
| 2005/0177767 | A1 * | 8/2005 | Furuya et al. ............... 714/13 |
| 2005/0181803 | A1 | 8/2005 | Weaver et al. |
| 2005/0262246 | A1 * | 11/2005 | Menon et al. ............ 709/226 |
| 2006/0062555 | A1 | 3/2006 | Zimmermann et al. |
| 2006/0087990 | A1 | 4/2006 | Kakivaya et al. |
| 2006/0190552 | A1 | 8/2006 | Henze et al. |
| 2006/0259662 | A1 | 11/2006 | Furukawa et al. |
| 2006/0272015 | A1 | 11/2006 | Frank et al. |
| 2007/0104326 | A1 * | 5/2007 | Feigenbaum et al. ......... 380/44 |
| 2008/0109580 | A1 | 5/2008 | Carlson et al. |
| 2008/0244033 | A1 | 10/2008 | Hook et al. |
| 2008/0273540 | A1 | 11/2008 | Gerovac et al. |
| 2009/0313661 | A1 * | 12/2009 | Liu et al. ..................... 725/87 |
| 2010/0011002 | A1 * | 1/2010 | Gerovac et al. ............. 707/10 |
| 2010/0011003 | A1 * | 1/2010 | Carver et al. ............... 707/10 |
| 2010/0011091 | A1 | 1/2010 | Carver et al. |
| 2010/0011096 | A1 | 1/2010 | Gerovac et al. |
| 2010/0011145 | A1 | 1/2010 | Carver et al. |
| 2010/0011364 | A1 * | 1/2010 | Gerovac et al. ............. 718/104 |
| 2010/0011365 | A1 * | 1/2010 | Gerovac et al. ............. 718/104 |
| 2010/0011366 | A1 * | 1/2010 | Gerovac et al. ............. 718/104 |

FOREIGN PATENT DOCUMENTS

| | | |
|---|---|---|
| WO | WO 2010/006132 | 1/2010 |
| WO | WO 2010/006134 | 1/2010 |

OTHER PUBLICATIONS

Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.

Liu et al.; "Scheduling Algorithms for Multiprogramming in a Hard-Read-Time Environment;" Journal of the Association for Computing Machinery, vol. 20, No. 1; DOI=http://doi.acm.org/10.1145/321738.321743; Jan. 1973; pp. 46-61.

Long et al; "Swift/RAID: A Distributed RAID System;" Comput. Syst. 7, 3; Jun. 1994; pp. 333-359.

Mourad; "Issues in the design of a storage server for video-on-demand;" Multimedia Systems; vol. 4, No. 2; Apr. 1, 1996; XP008040912; pp. 70-86.

"NAND Flash Memories and Programming NAND Flash Memories Using ELNEC Device Programmers Application Note Version 2.01;" Sep. 2006, pp. 1-31.

Samsung Memory Division; NAND Flash ECC Algorithm 256B; Jun. 24, 2004; 8 sheets.

Samsung Memory Division; ECC Algorithm; 512B; Apr. 28, 2005; 8 sheets.

Samsung Memory Division; NAND Flash Spare Area Assignment Standard; Apr. 27, 2005; 5 sheets.

Sha et al.; "A Systematic Approach to Designing Distributed Real-Time Systems;" Computer vol. 26, No. 9; DOI=http://dx.doi.org/10.1109/2.231276; Sep. 1993; pp. 67-78.

PCT Search Report of the ISA for PCT/US2008/061401 dated Jul. 1, 2008.

PCT Search Report and Written Opinion of the ISA for PCT/US2009/050051 dated Sep. 7, 2009.

Ruemmler, et al., "An introduction to disk drive modeling." IEEE Computer Magazine, 27(3), pp. 17-29, Mar. 1994.

Talagal, et al., "Microbenchmark-based extraction of local and global disk characteristics", Technical Report. Department of Computer Science, University of California at Berkeley, CSD-99-1063, 1999.

Schindler, et al., "Automated disk drive characterization", Technical Report CMU-CS-99-176, Carnegie Mellon University, Nov. 1999.

Worthington, et al., "On-Line Extraction of SCSI Disk Drive Parameters" SIGMETRICS 95, pp. 146-156, 1995.

Teorey, et al., "A Comparative Analysis of Disk Scheduling Policies", Communications of the ACM, v.15 n.3, pp. 177-184, Mar. 1972.

Oney, "Queueing Analysis of the Scan Policy for Moving-Head Disks", Journal of the Association for Computing Machinery, vol. 22, No. 3, Jul. 1975, pp. 397-412.

Worthington, et al., "Scheduling for Modern Disk Drives and Non-Random Workloads", University of Michigan, Technical Report CSE-TR-194-94, Mar. 1, 1994.

Reddy, et al., Issues in a multimedia system, IEEE Computer Magazine 27, 3, pp. 69-74, Mar. 1994.

Zimmermann, "Continuous Media Placement and Scheduling in Heterogeneous Disk Storage Systems", Technical Report USC-99-699, 1999.

Shenoy, et al., "Cello: A Disk Scheduling Framework for Next Generation Operating Systems", Real-Time Syst. 22, 1-2, 9-48, Jan. 2002.

Goel, et al., "SCADDAR: An Efficient Randomized Technique to Reorganize Continuous Media Blocks", 18th International Conference on Data Engineering (ICDE 2002), San Jose, California, Feb. 26-Mar. 1, 2002.

Shahabi, et al., "Yima: A Second-Generation Continuous Media Server", IEEE Computer Magazine, pp. 56-64, Jun. 2002.

Schroeder, et al., "Disk failures in the real world: What does an MTTF of 1,000,000 hours mean to you?", Proceedings of the 5th USENIX Conference on File and Storage Technologies (FAST '07), pp. 1-16, 2007.

Pinheiro, et al., "Failure Trends in a Large Disk Drive Population", Proceedings of the 5th USENIX Conference on File and Storage Technologies (FAST '07), pp. 17-28, 2007.

Androutsellis-Theotokis, et al., "A Survey of Peer-to-Peer Content Distribution Technologies", ACM Computing Surveys, vol. 36, No. 4, pp. 335-371, Dec. 2004.

Venugopal, et al., "A Taxonomy of Data Grids for Distributed Data Sharing, Management, and Processing", ACM Computing Surveys, vol. 38, No. 3, pp. 1-53, Mar. 2006.

Amazon, "Amazon S3 Developer Guide (API Version Mar. 1, 2006)", Internet, 2007.

Liskov, et al., "Providing Persistent Objects in Distributed Systems", Proceedings of the 13th European Conference on Object-Oriented Programming, Jun. 14-18, 1999.

Liskov, et al., "Transactional File Systems Can Be Fast", Proceedings of the 11th Workshop on ACM SIGOPS European Workshop: Beyond the PC, Sep. 19-22, 2004.

Braam, "File Systems for Clusters from a Protocol Perspective", Second Extreme Linux Topics Workshop, Monterey, Jun. 1999.

Hartman, et al., "The Zebra Striped Network File System", ACM Transactions on Computer Systems, vol. 13, No. 3, pp. 274-310, Aug. 1995.

Long, et al., "Swift/RAID: A Distributed RAID System", Computer Systems, vol. 7, No. 3, pp. 333-359, Jun. 1994.

Patterson, et al., "A Case for Redundant Arrays of Inexpensive Disks (RAID)" Proceedings of the 1988 ACM SIGMOD International Conference on Management of Data, ACM Press, Jun. 1988.

Chen, et al., RAID: High-Performance, Reliable Secondary Storage, ACM Computer Survey vol. 26, No. 2, pp. 145-185, Jun. 1994.

Stonebraker, et al., "Distributed RAID—A New Multiple Copy Algorithm", Proceedings of the Sixth International Conference on Data Engineering, IEEE Computer Society, pp. 430-437, Feb. 1990.

Thouin, et al., "Video-on-Demand Networks: Design Approaches and Future Challenges", IEEE Network, Special Issue, vol. 21, No. 2, pp. 42-48, Mar. 2007.

(56) References Cited

OTHER PUBLICATIONS

Stoller, et al., "Storage Replication and Layout in Video-on-Demand Servers", Proceedings of the 5th International Workshop on Network and Operating System Support for Digital Audio and Video, Apr. 19-21, 1995.

Tetzlaff, et al., "Elements of scalable video servers", Proceedings of the 40th IEEE Computer Society International Conference, pp. 239-248, Mar. 1995.

Wong, et al., "Strategic Selection and Replication of Movies by Trend-Calibrated Movie-Demand Model", Proceedings of the 2000 international Conference on Microelectronic Systems Education, IEEE Computer Society, pp. 97-100, Nov. 2000.

Little, et al., "Popularity-Based Assignment of Movies to Storage Devices in a Video-on-Demand System", Multimedia Systems, vol. 2, No. 6, pp. 280-287, Jan. 1995.

Griwodz, et al., "Long-term Movie Popularity Models in Video-on-Demand Systems", Proceedings of the 5th ACM International Conference on Multimedia, pp. 349-357, Nov. 1997.

Ghandeharizadeh, et al., "Continuous Display of Video Objects Using Multi-Zone Disks", Univ. of Southern California, USC-CSE-94-592, Apr. 12, 1995.

Sinah, et al., "Intelligent Architectures for Managing Content", Communications Technology Magazine, May 1, 2003.

U.S. Appl. No. 11/744,394, filed May 4, 2007.

Office Action dated May 7, 2010 from U.S. Appl. No. 12/170,769.

Restriction Requirement dated Jul. 9, 2010 from U.S. Appl. No. 12/170,787.

Restriction Requirement dated Jun. 10, 2010 from U.S. Appl. No. 12/170,624.

PCT Invitation to Pay Additional Fees dated Oct. 26, 2009 for PCT Pat. No. PCT/US2009/050057 filed on Jul. 9, 2009.

PCT Search Report of the ISA for PCT/US2009/050057 dated Jan. 14, 2010.

Written Opinion of the ISA for PCT/US2009/050057 dated Jan. 14, 2010.

* cited by examiner

DATA ACCESS IN DISTRIBUTED SYSTEMS

CROSS-REFERENCE TO RELATED APPLICATIONS

This application is related to U.S. patent application Ser. No. 12/170,657, Jul. 10, 2008, (now U.S. Pat. No. 8,099,402) and U.S. patent application Ser. No. 12/170,666, filed Jul. 10, 2008, (now U.S. Pat. No. 8,954,976). The contents of the above applications are incorporated herein by reference.

BACKGROUND

This specification relates to data access in distributed systems.

Distributed network-based data storage, for example accessible over the Internet, has various applications. One application is video storage and access.

During the past decade, online video streaming has gained increasing popularity among Internet users as high speed Internet service is now readily available for households. For example, while traditional video delivery systems (e.g., cable television systems) may no longer satisfy customers' growing demand for convenient access and instant delivery, movie consumers may soon turn to online video stores that may provide such service. However, in practice, it is nontrivial to build an Internet-based storage system, equipped with libraries comparable in size to traditional video rental stores, for providing reliable movie download service to consumers at a reasonable cost. The following example illustrates some of the difficulty behind the idea.

Consider a sample system for a movie download service with 20K movie titles each 2 hrs in length encoded at 2.5 Mbps that is configured to serve 15K simultaneous sessions. In the past, this would have been considered an extensive library for a well-equipped video rental store. (In comparison, NetFlix currently lists a growing number of about 70K+ titles.) Since each movie title occupies about 2.25 GB storage (i.e., 2 hr*2.5 Mb/s*60 sec*60 min/8), the amount of raw storage needed for 20K titles is 45 TB. In addition, if mirroring is used for resilience, the minimum storage required for this entire library is 90 TB, which can be achieved by using approximately 96 1 TB disks organized as e.g., 4 servers each having 24 disk drives.

In the above sample system, the amount of access bandwidth needed for allowing 15K simultaneous sessions is 37.5 Gbps, which would then require ~400 Mbps from each of the 96 disks assuming an equal load over these disks. However, this access rate would exceed common practice for general purpose storage systems. Under typical workloads, a conventional storage system may be able to provide an average bandwidth of 50 Mbps per disk. Even tuned media storage servers that have been configured to supply extraordinary bandwidth of up to about 150~200 Mbps may no longer be sufficient for the sample system. Moreover, the level of difficulty in achieving satisfactory access bandwidth rises progressively with the size of the sample system.

Some approaches to determining a system configuration for such an application may approach the problem at issue essentially as dynamic distributed real-time resource allocation, which is particularly hard to solve for large systems since the problem usually grows with combinatorial complexity as the system expands in size. Briefly, a dynamic distributed real-time resource allocation and scheduling problem in nature can be characterized as an NP complete problem, which means that there are no deterministic solutions computable within a tractable/practical period of time, in other words, the solutions have combinatorial complexity in space and/or time. Traditional approaches to solving NP complete problems often try to restrict the problem in some manner so that the restricted problem is amenable to a deterministic solution. However, such restricted solutions may fail for a number of reasons. For instance, the solution to the restricted problem may not actually reflect the solution to the original problem. Furthermore, when the deterministic solution hits boundary conditions in the problem space, the problem turns combinatorial again, sometimes causing the deterministic solution to produce catastrophic results.

SUMMARY

In general, in one aspect, the invention features a computer-implemented method that includes receiving a request for access to a first item of content stored on resources of a storage environment, the request for access being initiated by a first user, identifying an existing resource allocation arrangement associating elements of the first item of content with respective elements of the resources of the storage environment, performing an inquiry to determine whether an admission condition is satisfied, and upon satisfaction of the admission condition, generating a specification of an access operation, the access operation configured to enable a selected set of elements among the respective elements of the resources of the storage environment to be accessed.

Aspects of the invention may include one or more of the following.

The method of performing the inquiry may include evaluating a workload condition of the resources of the storage components.

The method of performing the inquiry may include evaluating a deviation in load across the respective elements of the resources of the storage environment associated with the first item of content.

The method performing the inquiry may include determining an availability of a capacity of a first storage component, the first storage component being an aggregation of some of the respective elements of the resources of the storage components associated with the first item of content.

The capacity of a first storage component may include an access capacity characterized at least in part by a maximum data readout rate of the first storage component.

The first storage component may include one or multiple storage devices selected from at least one of the following types; disk drives, solid-state memories, and non-volatile memories.

A description of the existing resource allocation arrangement may be maintained in a first database, the description including a representation of a plurality of mappings, each mapping being associated with each one of multiple instances of the first item of content stored on the resources of the storage environment.

The method of generating the specification of the access operation may include evaluating a quality of each of the plurality of mappings associated with the first item of content, and based on a result of the evaluating the quality, selecting a preferred mapping among the plurality of mappings according to a preset criterion.

The preset criterion may be associated with a degree of potential resource allocation conflict.

The access request may include an attribute characterizing the first item of content.

The method of generating the specification of the access operation may depend at least in part on the attribute characterizing the first item of content.

The attribute may include a set of attributes comprising one or more of the following: file name, data length, data type, and a universal resource identifier (URI).

The method may further include receiving a particular set of access request through a secured channel based on a verification of an identity of the first user.

Other general aspects include other combinations of the aspects and features described above and other aspects and features expressed as methods, apparatus, systems, computer program products, and in other ways.

Other features and advantages of the invention are apparent from the following description, and from the claims.

DETAILED DESCRIPTION

1 System Overview

Figure 1:
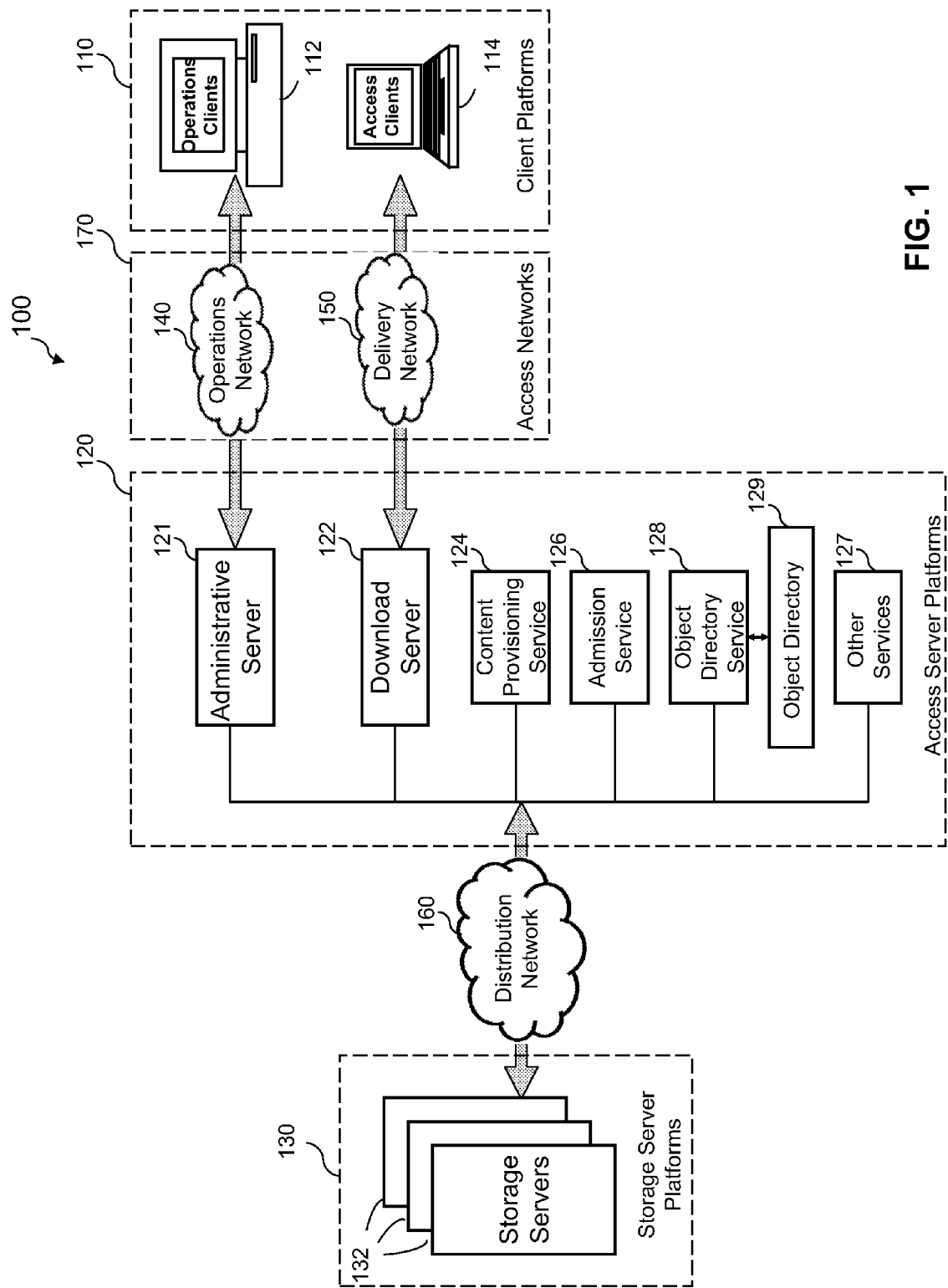
FIG. 1 is a block diagram of an exemplary distributed system for data storage and access.

Referring to FIG. 1, a distributed system 100 consists of three basic types of computing platforms for content storage and delivery: storage server platforms 130, access server platforms 120, and client platforms 110. The term "platform" is used to refer to a collection of components, which may, for example, be hosted on a single computer, or distributed over multiple computers.

The storage server platforms 130 may host multiple storage servers 132, each of which in turn coordinate access to a set of storage resources, providing the capability to read and write data. For example, each server may be hosted on one computer, or its function may itself be distributed on multiple hardware elements. Each storage server may include one or multiple storage devices of various types. Examples of storage devices include disk drives, solid-state memories (such as RAM), and non-volatile memories (such as flash).

The access server platforms 120 provide access services that collectively provide one or more methods of accessing data/content with respect to storage servers of the system. Some access services handle the data according to a prescribed access protocol/regime/interface (e.g., HTTP, RTSP, NFS, etc). Other access services manage the resources of the system and regulate access to content accordingly. Services that manage resources of the system include, for example, a content provisioning service 124, which allocates resources of the system to store and deliver content, and an admission service 126, which admits sessions when called upon by various session requests in the system.

In general, the access server platforms 120 are physically bounded on one side by the distribution network 160, which provides an interconnection between the storage server platforms 130 and the access server platforms 120, and on the other side by access networks 170, which provide interconnections between the client platforms 110 and the access server platforms 120. Note that different access services provided by one or multiple access server platforms may also communicate over the distribution network 160 or by some other network in the system. The access networks 170 include an operations network 140 over which one or more operations clients 112 (e.g., administrators of online video stores) communicate with the access server platforms 120, and a delivery network 150 over which one or more access clients 114 (e.g., customers of online video stores) communicate with the access server platforms 120.

The access server platforms 120 host one or more externally accessible administrative servers 121, which provides an interface linking the operations network 140 to services of the access server platforms 120 and the storage server platform 130, for example, to provide a secure means to ingest, retrieve and verify content stored within the system. Through an administrative server 121, operations clients 112 are given administrative access to the system, for example: 1) to upload content to the system; 2) to download content from the system; 3) to delete existing content from the system; and etc. In some examples in which the administrative server 121 provides a software interface to operations clients using the HTTP protocol, these administrative accesses may correspond to the HTTP methods of "PUT," "GET," and "DELETE," respectively or to some other combination of HTTP methods, "POST" and "DELETE" for example. Preferably, access to the administrative server 121 is privileged to operations clients 112.

The access server platforms 120 also host one or more externally accessible download servers 122. Through a download server 122, access clients 114 may request to stream or download content from the system for example, according to a defined set of rules (a regime or protocol) for streaming and downloading content.

As illustrated in FIG. 1, no direct link between the storage and the client is required because storage and access functions are decoupled in the system. When a client performs an operation, e.g., uploading or downloading content, the administrative server 121 or download server 122 communicates on behalf of its client to the storage servers, mainly to put or get data to or from storage resources, and to other elements in the system, e.g., to locate resources and control admissions. This separation of storage and access brings flexibility to the configuration and evolution of the system, and significantly reduce the system's reliance on synchronization, which tends to overwhelm a distributed system as it scales.

Upon receiving an upload request from the operation clients 112, the administrative server 121 receives inputs that contain an external name (e.g., a URI, namely, a Uniform Resource Identifier) of the content to be uploaded, and the content itself (e.g., binary data encoding a video stream). Upon receiving download request from the access clients 114 or operations clients 112, the download server 122 or the administrative server 121, respectively, receives the external name (e.g., also a URI) of the content to be downloaded, and if possible provides the requested content.

In some examples, the administrative server 121 may acquire from the operations clients (e.g., receive with the request) a set of attributes along with an upload or download request that are used by the administrate server 121 in servicing the request. Attributes can include e.g., provisioning attributes, access attributes, and admission attributes. An illustrative example of an attribute provided with an upload is the maximum concurrent streaming sessions allowed for a particular piece (i.e., a title or object) of content. For example, if the content is restricted to a maximum of 5 concurrent sessions, the content provisioning service may determine a good arrangement of the data for that piece on the storage servers, and later the admission service may refuse a download request if it would exceed the limit of 5 sessions.

An object directory service 128 provides an interface to a persistent database (e.g., an object directory 129) that is used to store information associated with objects being handled by the system. One example of information that may be stored is the assignment of external names to internal object identifiers (OIDs). A second example is information describing where content is located on the storage servers/storage resources of the system. Elaborating on this second example, the object directory 129 may contain a map table associated with a particular movie title describing how the data for the title is stored on the storage servers, including the number of copies of the title being kept and the disk drives and the specific blocks where each copy is located. A third example is information representing provisioning attributes (e.g., peak cumulative access bandwidth for the content and resilience factors), admissions attributes (e.g., attributes that govern whether sessions involving the content are allowed to be created or not), and access attributes (e.g., attributes that govern at what rate data is delivered for sessions involving the content).

It should be understood that the data stored in the object directory is not limited to these examples, but could be any type and/or amount of data including the data for the externally referenced object in its entirety.

In the following sections, the use of content provisioning and admission services is described in greater detail in the context of two principal operations in the distributed system 100—"UPLOAD" and "DOWNLOAD" operations.

2 Example of "UPLOAD" Operation

Figure 2:
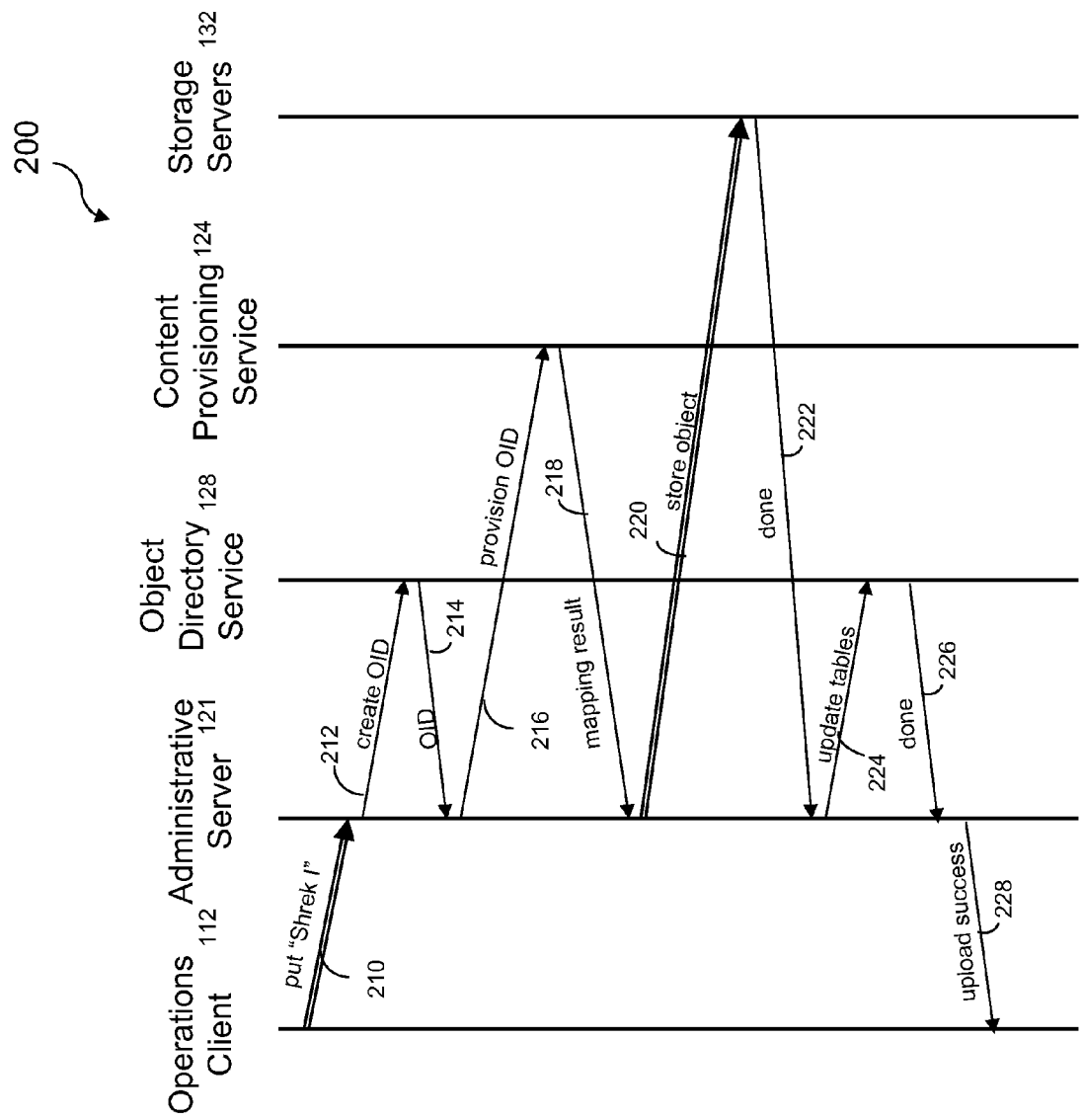
FIG. 2 is a representation of the flow of events during an "UPLOAD" operation when an operations client uploads content to storage servers.

Referring to FIG. 2, in an example of an "UPLOAD" operation 200, an operations client 112 initiates a request 210 through the administrative server 121 for uploading a movie (e.g., "Shrek I") to the system. Data received by the administrative server along with request 210 includes the external name for the content of "Shrek I" and the movie content itself. Note arrows in the figure represent logically unidirectional communications from one interface to another (although the underlying protocol may in fact include e.g., bidirectional handshakes etc), and double arrows indicate there is actual data content being delivered along that communication. In addition to the external name and the movie content, the client may provide attributes, including traditional attributes (such as content size and content type) and a collection of non-traditional attributes (such as maximum concurrent access sessions, popularity, resilience, integrity, life cycle, and topological and geographical attributes) that affects the handling of each content.

Upon receiving the external name, the administrative server sends the name in a command 212 requesting the object directory service 128 to create an object for "Shrek I" and to generate an OID mapping for the external name. Once the object is successfully created, the object directory service 128 delivers a message 214 to inform the administrative server 121. Subsequently, the administrative server calls the content provisioning service 124 via a request 216 to provision the content. Also along with request 216, the administrative server passes provisioning attributes of the content, which are used during content provisioning to decide what resources of the system, if available, to allocate to the content.

During system configuration, a set of potential resource arrangements can be pre-determined for content with certain types of provisioning attributes, where each arrangement represents, for example, a way of striping copies of content across one or several storage resources of the system. This enables the content provisioning service to make an efficient provisioning decision. For example, the content provisioning service uses the attributes to find and evaluate a best mapping, for example by approximating server occupancy at the given time and finding possible sets of servers that can be used to meet the content requirements (e.g., performance requirements) of the content.

Here, a mapping generally refers to information describing a potential arrangement of the data for an object on storage resources of the system, including e.g., the set of disk drives to be used and the associated disk region on each drive. If the best mapping is permissible, meaning the content provisioning service can, in this example, allocate sufficient blocks in the selected disks to the content without threatening overall system performance, the content provisioning service sends a message 218 to the administrative server carrying the mapping result. Based on the mapping result, the administrative server then writes the content to the allocated blocks on the storage servers 132 via a set of messages 220. In some situations when multiple copies of the content are desired on the system, the content provisioning service may determine a best mapping for each copy individually.

In some cases, the best mapping may fail due to conflicts in resource allocation. For example, among other pieces of content being provisioned, one may have occupied certain blocks on a disk drive which also happens to be included in the mapping result of "Shrek I". In those situations, a new mapping for "Shrek I" is selected to repeat the evaluation process until a permissible mapping has been found. Subsequently, the administrative server writes the content to the blocks on the disk drives allocated by the mapping or set of mappings.

After content transfer is complete, the storage servers send a "done" signal 222 to the administrative server, which then instructs the object directory service to document the committed mapping (via message 224), so that the object directory can identify the location of the content for subsequent access by clients. Upon receiving a "done" message 226 from the object directory service reporting completion of updates, the administrative server notifies the operations client (via an "upload success" message 228) that the "UPLOAD" operations has been successfully completed.

3 Example of "DOWNLOAD" Operation

Figure 3:
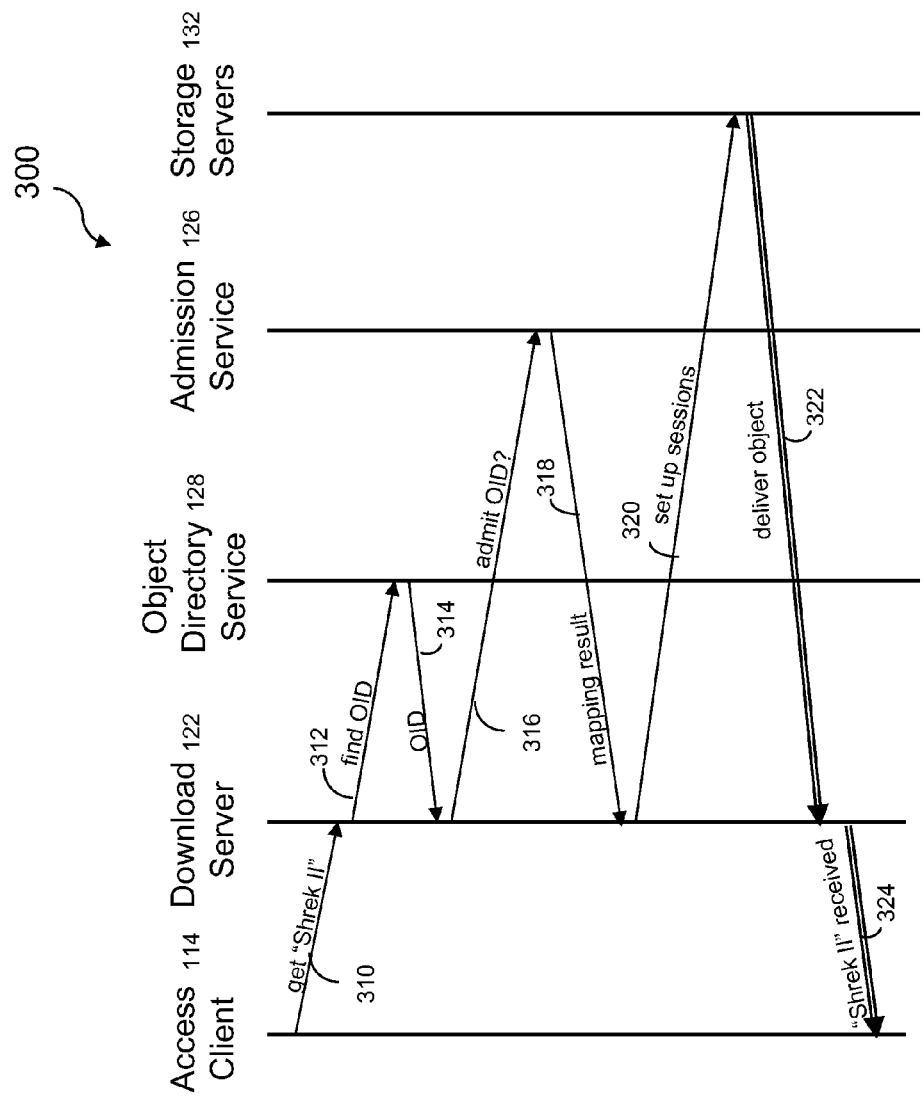
FIG. 3 is a representation of the flow of events during a "DOWNLOAD" operation when an access client downloads content from storage servers.

Referring to FIG. 3, in an example of a "DOWNLOAD" operation 300, an access client initiates a request 310 through the download server 122 for downloading a desired movie (e.g., "Shrek II"). After receiving the external name of the content of "Shrek II", in general, the download server 122 makes use of the services in the access server platforms to determine whether the request for the content can or should be admitted and if so, how the content should be obtained from the storage servers. In particular, using the external name, the download server 122 calls the object directory service 128 via a request 312 to discover whether the object exists and if so, to locate the corresponding object value in the object directory. Given the object exists, the object directory service returns the object value to the download server via a message 314. The object value contains the object's OID, some or all associated mappings (or partial mappings) that describe a set of storage resources holding the content, and other attributes associated with the content. Subsequently, the download server 122 calls on the admission service 126 to determine whether or not to admit the download request of the content, and if yes, how this download request should be handled.

The admission service 126, in general, is configured to admit combinations of sessions that are consistent with a workload that can be supported by the resources of the system, and to deny sessions that threaten the integrity of existing sessions when the system is near saturation. Therefore, prior to granting/denying an upload or download request, the admission service first checks the usage and availability of various system resources. In one embodiment and this example of "DOWNLOAD" operation, resource checks/reservations are conducted by the admission service, including, for example: 1) checking the bandwidth allocated to existing sessions involving the same content "Shrek II" to make sure that the prospective new session will not cause the content to become oversubscribed; 2) checking the available server resources to determine which one of possible multiple copies of the content provides the greatest serviceability (e.g., the service bandwidth that would remain available on the most heavily used server of a copy) and reserving the storage servers associated with this copy; and 3) checking and reserving available unit resources (e.g., disk time or bandwidth) on the reserved storage servers to be accessed for downloading. In addition, there are many other types of resources that need to be allocated or checked, depending on the implementation. For example, access server/platform capacity may be checked and the admission service might respond with a message indicating that the access server should redirect the client to a different access server.

In determining which of the multiple copies of the content on the storage servers 132 is to be accessed to satisfy this download request, generally, the admission service selects the copy with the lowest average server load, though deviation in load across the set of servers may also be taken into account. For instance, a copy with a low average and a high deviation may be less desirable than a copy with a moderately higher average, but low deviation. Moreover, it is desirable to include a certain amount of statistical spread in the choice to ensure that lightly loaded resources will not get overwhelmed (a condition that can happen during session failure recoveries). On occasion, if none of the copies has sufficient resources available at the moment, the session is denied.

When the admission service 126 decides to admit the download request and selects the copy of content to service the client, it sends a message 318 with the mapping of the selected copy to the download server 122, which then requests the storage servers via message 320 to set up download sessions with the identified blocks on the storage servers. Subsequently, the content of "Shrek II" is delivered from storage to the download server and passed on to the access client via data lines 322 and 324, respectively. By the time the client receives the entire data content of the movie "Shrek II", the "DOWNLOAD" operation completes. When the "DOWNLOAD" operation terminates or completes, the resources reserved for it are released or marked for later garbage collection.

4 Example of Attributes-Based Content Provisioning Service

In the exemplary "UPLOAD" operation described above, the content provisioning service 124 makes use of provisioning attributes to find a best mapping of arranging the content on the storage servers that can satisfy the requirements (e.g., performance requirements) of the content. One example of a performance requirement is the access bandwidth, which relates to the maximum number of concurrent sessions permissible to access the content at any given time. The following example illustrates how the content provisioning service may determine a best mapping that supports the access bandwidth requirement, by using a particular provisioning attribute—maximum concurrent streaming sessions.

Figure 4A:
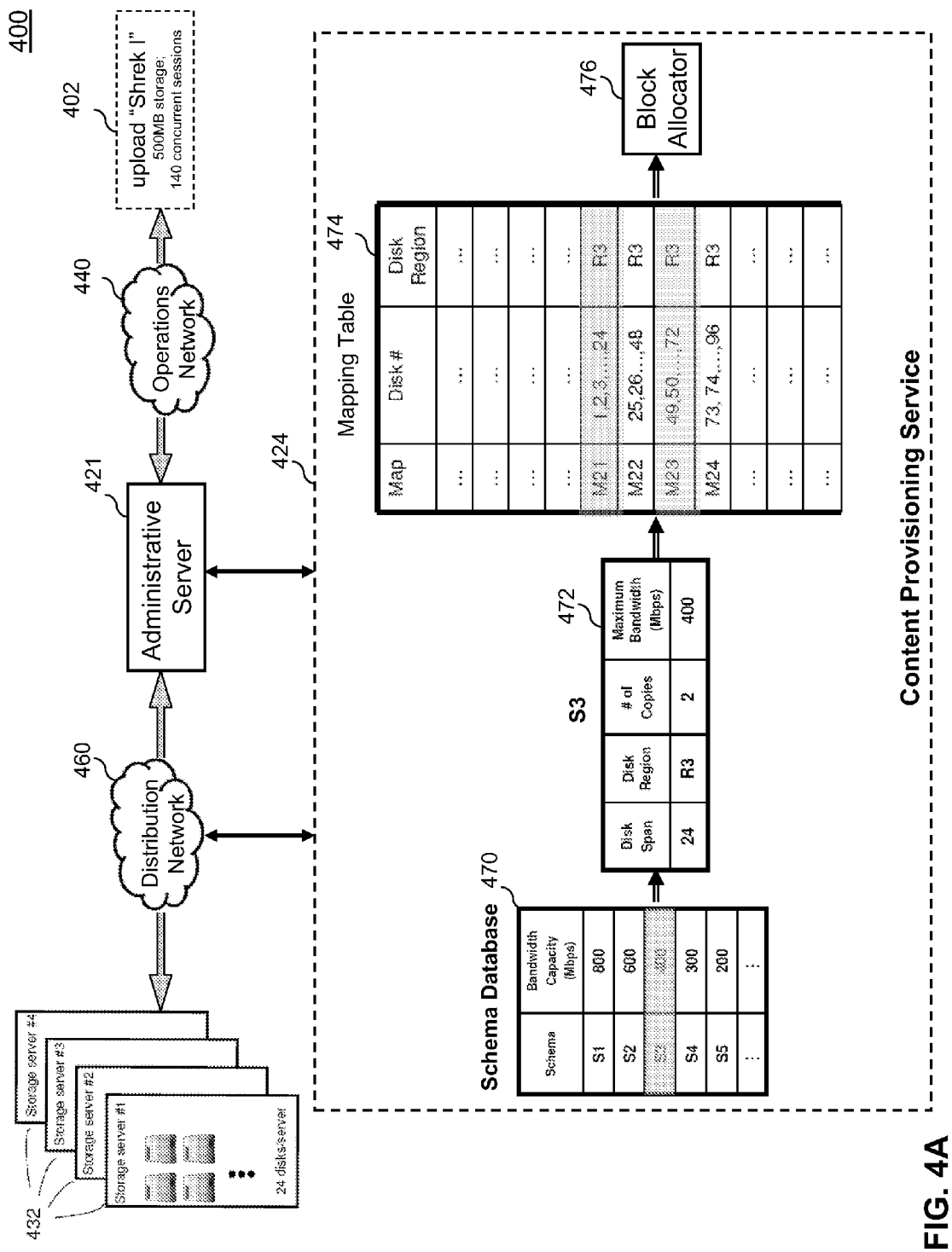
FIG. 4A is a diagram of the system handling an exemplary upload request.

Referring to FIG. 4A, for example, a system 400 is designed to host a movie library of about 20K titles, with each copy of the title occupying ~500 MB storage space and a client access rate of 2.5 Mbps. Assume the system 400 has 96 1 TB disk drives uniformly distributed across four storage servers 432, providing a storage capacity of 96 TB. For each disk drive, for example, a 100 Mbps access bandwidth amounts to an access capacity (i.e., maximum access bandwidth) of 9.6 Gbps for the system. (Note that other examples may have different movie characteristics and system storage and access capacities. For example, for a title encoded at 2.5 Mbps with an approximate length of 100 minutes, each copy occupies ~2 GB storage space. With mirroring, 20K titles would then take up about 80 TB of storage space (e.g., 80 1 TB disk drives). Given that each disk has 400 Mbps of access bandwidth, the total access bandwidth of the system may be up to ~32 Gbps.)

To make a good arrangement of resource allocation to each title in the library, a general approach of the system is to distribute content of higher demands across a greater number of disks, so that the aggregate access bandwidth for the content is sufficient to support all the concurrent streaming sessions at peak usage.

For example, when the administrative server 421 receives a request 402 from an operations client for uploading the movie of "Shrek I" to storage, it is also informed that, for "Shrek I", up to 140 concurrent streaming sessions may occur at any given time, suggesting a peak streaming rate of 350 Mbps (here, assume the movie is encoded at 2.5 Mbps). With each disk drive supporting an access rate of 100 Mbps at maximum, 350 Mbps bandwidth can not be achieved unless the movie data is stripped across an absolute minimum of 4 disk drives. Thus, one option for the content provisioning service to distribute the content is to map the data to 4 disk drives, although this may not be a very good option because when this title is in peak usage the other data on the 4 drives can be rendered inaccessible (an example of inter-title contention). Better options take into account inter-title contention and thus disperse such data more broadly, say over 6, 12, or even 24 disk drives. In general, there exist a collection of such mappings that each can meet the 350 Mbps bandwidth requirement of servicing the content.

Here, such a collection of mappings with a common objective (e.g., bandwidth capacity) is called a schema. As for the sample movie library, each title has a corresponding schema that satisfies the content requirements (such as access bandwidth) of that title.

Computing the schema to meet the requirements of each title is non-trivial and the level of difficulty often grows progressively with system size. Therefore, in some examples, in order to reduce the burden on content provisioning service, a set of schemas are pre-computed, for example, based on an expected or modeled distribution of attributes, and stored in a database made available for use to the content provisioning service 424. This pre-computed set of schemas is used to reduce computational cost and improve overall system efficiency.

Figure 4B:
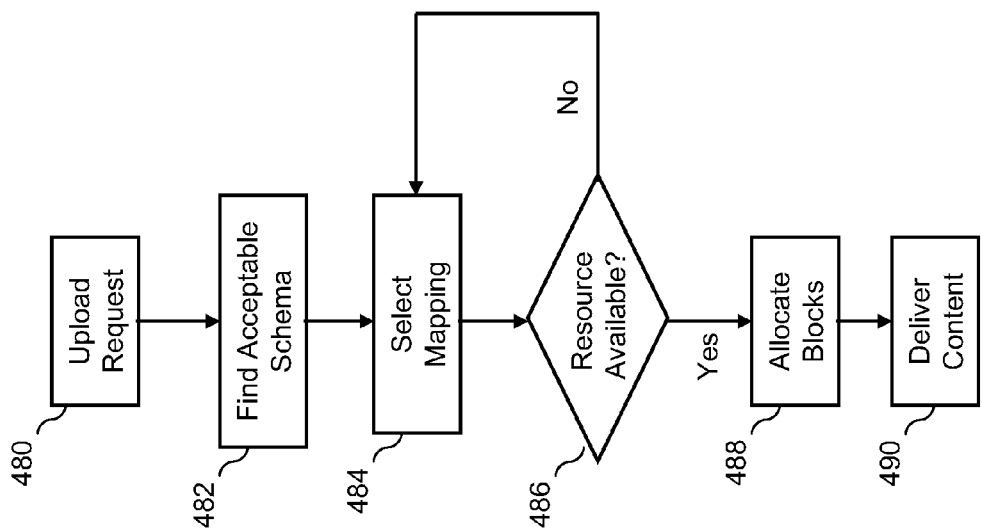
FIG. 4B is a flow chart of a content provisioning process.

Referring to FIG. 4B, by using a pre-computed schema database, the sample system 400 provisions content in the following way. First, upon receiving an upload request 480, the content provisioning service 424 finds from the schema database an acceptable schema that complies with the requirements of the content, during step 482. Next, among the mappings associated with the selected schema, the content provisioning service determines a best mapping, for example, the mapping with the lowest server occupancy, during step 484. If, in a following step 486, sufficient resource can be found on disk drives specified in the best mapping, the content provisioning service 424 then allocates a group of blocks on each disk drive to the content (step 488) before the content delivery process starts (step 490). If however, the content provisioning service 424 fails to locate sufficient resource in the best mapping during step 486, it select an alternative mapping in the schema to repeat step 486 until an acceptable one is found to proceed the block allocation.

This general concept of attributes-based content provisioning using schemas is further illustrated in the example of uploading "Shrek I", shown in FIG. 4A. As previously discussed, a 350 Mbps access bandwidth is desired in this case. Therefore, in this schema database 470, schema S3 (shown as table 472) with a bandwidth capacity of 400 Mbps is considered an acceptable schema by the content provisioning service 424. This schema S3 further states that, for each content that falls in this category, two copies of the content will be stored on the system, with each copy distributed over 24 disks and written in region R3 of each disk.

Following the selection of S3, a mapping table 474 is populated to describe a set of possible mappings of the schema to disk drives. For example, in this mapping table 474, M21, M22, M23, and M24 correspond to four orthogonal mappings of S3 to the storage, each mapping using a specific set of disks (such as disks 1 through 24 in M21) and a designated disk region (R3). Among all possible mappings associated with schema S3, the content provisioning service seeks a best mapping for each copy of the content, for example by approximating server occupancy at the given time. In this example, the content provisioning service selects mappings M21 and M23 for storing two copies of "Shrek I", respectively. If these two mappings are found to be permissible, a block allocator 476 commits allocation of blocks on disk drives according to these mappings. Once the allocated blocks are available and reserved for occupancy, the administrative service 421 writes the content data via the distribution network 460 to the storage servers 432.

5 Examples of Content Provisioning Using Multiple Attributes

In some applications, the content provisioning service makes use of multiple attributes to find the best mapping of arranging the content on the storage servers. Examples of such attributes include attributes that characterize popularity, resilience, and integrity.

Popularity is an expression of anticipated demand for a piece of content. For example, if content is popular, demand for it will likely be high, and thus the provisioning system will attempt to provision the content with the resources necessary to meet the expected demand.

Resilience relates to a predicted level of service maintained to an information object in the presence of component failure. For example, in accessing a resilient object, a customer encountering a failed read on disk A can continue to be serviced through reading an alternative copy of data on disk B. Generally, the more resilient an object needs to be, the more resources (and possibly the more types of resources) the content provisioning system needs to allocate to that object.

Integrity relates to the ability to recover content after a component failure, even a catastrophic failure of the system. For example, if a disk fails completely and is unrecoverable, the portions of content contained on the disk can be recovered from an alternate copy of the content within the system or across systems and/or from an encoded reconstruction method.

Depending on the implementation, the content provisioning service may determine the best mapping for storing a piece of content that provides a satisfactory degree of popularity, resilience and/or integrity to that piece of content.

Figure 5:
FIG. 5 shows exemplary schemas associated with multiple attributes.

Referring to FIG. 5, some schemas that provide different degrees of popularity, resilience, and integrity are shown in schema table 500. For example, referring to schema 4 (S4), in uploading a relatively low popularity title that requires a certain degree of resilience, one primary copy is provided to satisfy the popularity demand. In the mean time, two secondary copies of the title are stored to ensure that in the case of a failed read on the primary copy, customers are still able to access this title through the secondary copies without experiencing service interruption. Schema 5 (S5) provides another scenario of uploading a relatively low popularity title that is nevertheless important such that a high level of integrity is desired. Here, high level of integrity can be provided for example, by using advanced redundancy codes (although this can be computational expensive).

In some prior art systems, resilience and integrity are generally implicit and bound together within a storage redundancy method (e.g., RAID 5). In this description, one advantage of decoupling and making explicit the way resilience and integrity requirements are handled for each piece of content, is in allowing a system to support a combination of each requirement on a title by title basis and to use the most appropriate methods in satisfying the combination.

6 Other Examples of the Distributed System

Referring again to FIG. 1, in some examples, the access server platforms 120 of the distributed system 100 may provide other types of access services 127 in addition to the services described above. One example is a content re-provisioning service, which may decide to re-provision (including up and down provision) content in situations such as the occurrence of usage anomaly and content aging. Another example is a management service, which may coordinate the configuration, monitoring, control and data collection in the system. The management service may track both normal and exceptional events to diagnose system problems and anomalies and when necessary, trigger other services (such as re-provisioning services) in the system to perform subsequent actions.

Each service provided by the system may be implemented in various manners. In some examples, services may be bound to a particular platform (e.g., servers). Although such services are not individually resilient to occurrence of component failures, system resilience can be achieved by virtue of service replication and session level reassignment. In some examples, services may be distributed in multiple instances across a set of platforms. Distribution may be accomplished by partitioning the problem space (e.g., by process-pipelining, or by object-symmetric concurrency, etc.) to a degree necessary to achieve the performance and resilience requirement of the service. In some other examples, services can migrate from one platform to another. In particular, if a service is not implemented in a distributed manner, migration allows services to be relocated to other platforms in the system in case of service failure or degradation on one platform.

In some implementations, a storage server platform can be a well configured off-the-shelf computing system equipped with storage controller and network controller cards, configured to provide e.g., 10 GbE line-rate access to a set of storage resources (e.g., disks, memory). Controller cards can either be developed internally or qualified from readily available third party sources. In some examples, storage controllers provide unfettered high bandwidth access to the underlying storage devices. Examples of storage devices include disk drives, solid-state memories (such as RAM), and non-volatile memories (such as flash).

In some implementations, an access server platform can be a well configured off-the-shelf computing system equipped with network controller cards, configured to support a set of access regimes to content stored in the system. Access regimes are provided by access servers that may adopt a multitude of protocols and vary widely in performance and efficiency. One example of an access server is a Microsoft Windows Media Server (WMS), commonly used for streaming media on the Internet. Another example is an HTTP server, which uses HTTP protocol to provide clients access to content on the system. A third example is an Adobe's Flash Media Server.

Note that administrative servers and download servers are just two of potentially many types of access servers. Access servers are the general class of services that provide external access to objects in the system according to prescribed sets of rules.

Although the access servers (and services) and storage servers (and services) have been described as residing respectively on access and storage platforms, in some embodiments, a combination or all of access and storage servers and services can be configured to reside on a common platform.

In some embodiments, operations network 140 is isolated from the delivery network 150. The administrative server 121 and download server 122 may be exclusively accessible to the operations clients 112 and access clients 114, respectively. The download server 122 may provide features or semantics that are not suitable for operations clients, and vice versa.

It is to be understood that the foregoing description is intended to illustrate and not to limit the scope of the invention, which is defined by the scope of the appended claims. Other embodiments are within the scope of the following claims.

What is claimed is:

1. A method comprising:
   receiving, by a server device, a request to upload a first item of content;
   selecting, by the server device and based on receiving the request, a particular schema, from a plurality of schemas, to use for storing the first item of content,
      the particular schema being selected based on an anticipated demand for the first item of content, and
      the particular schema including:
         first information identifying a quantity of stored copies of the first item of content, and
         second information identifying an amount of bandwidth associated with accessing the first item of content;
   storing, by the server device and based on selecting the particular schema, the first item of content on resources of a storage environment associated with the server device;
   receiving, by the server device, a request for access to the first item of content,
      the request for access being initiated by a user device;
   identifying, by the server device and based on receiving the request for the access to the first item of content, the particular schema;
   analyzing, by the server device, a quantity of bandwidth allocated to one or more existing sessions associated with providing the first item of content;
   determining, by the server device, whether an admission condition is satisfied based on the particular schema, a usage of the resources of the storage environment, and an availability of the resources of the storage environment,
      the admission condition being satisfied based on determining, based on analyzing the quantity of bandwidth allocated to the one or more existing sessions associated with providing the first item of content, that a session associated with the request will not cause oversubscription;
   receiving, by the server device and when the admission condition is satisfied, a particular mapping of a copy of the first item of content; and
   providing, by the server device, the copy of the first item of content to the user device.

2. The method of claim 1, where determining whether the admission condition is satisfied further comprises:
   determining an available capacity of a first storage component,
      the first storage component including elements of the resources associated with the first item of content.

3. The method of claim 2, where the available capacity of the first storage component includes an access capacity based on a maximum data readout rate of the first storage component.

4. The method of claim 2, where the first storage component includes one or more storage devices selected from at least one of:
   a disk drive,
   a solid-state memory, or
   a non-volatile memory.

5. The method of claim 1, where information associated with the particular schema is stored in a first memory, the information including:
   information associated with a plurality of mappings,
      each of the plurality of mappings being associated with each one of multiple instances of the first item of content stored in the resources of the storage environment.

6. The method of claim 5, where receiving the particular mapping of the copy of the first item of content comprises:
   evaluating the plurality of mappings, associated with the first item of content, based on particular criteria; and
   selecting the particular mapping based on evaluating the plurality of mappings based on the particular criteria.

7. The method of claim 6, where the particular criteria is associated with an allocation of the resources of the storage environment.

8. The method of claim 1, where the access request includes at least one attribute associated with the first item of content.

9. The method of claim 8, where receiving the particular mapping of the copy of the first item of content is based on the at least one attribute associated with the first item of content.

10. The method of claim 8, where the at least one attribute associated with the first item of content includes one or more of:
    a file name of the first item of content,
    a data length associated with the first item of content,
    a data type of the first item of content, or
    a universal resource identifier (URI) associated with the first item of content.

11. The method of claim 1, where the particular mapping is based on at least one of:
    a measure of popularity of the first item of content,
    a measure of resilience associated with the first item of content, or
    a level of integrity associated with the first item of content.

12. The method of claim 1, where the particular mapping is based on a statistical spread associated with elements of the resources of the storage environment.

13. A system comprising:
    a processor; and
    a memory to store instructions, which when executed by the processor, cause the processor to:
       receive a request to upload a first item of content;

select, based on receiving the request, a particular schema, from a plurality of schemas, to use for storing the first item of content,
the particular schema being selected based on an anticipated demand for the first item of content, and the particular schema including:
first information identifying a quantity of stored copies of the first item of content, and
second information identifying an amount of bandwidth associated with accessing the first item of content;
store, based on selecting the particular schema, the first item of content on resources of a storage environment associated with the system;
receive, from a user device, a request for access to the first item of content;
identify, based on receiving the request for the access to the first item of content, the particular schema;
analyze a quantity of bandwidth allocated to one or more existing sessions associated with providing the first item of content;
determine whether an admission condition is satisfied based on the particular schema, a usage of the resources of the storage environment, and availability of the resources of the storage environment,
the admission condition being satisfied based on determining, based on analyzing the quantity of bandwidth allocated to the one or more existing sessions associated with providing the first item of content, that a session associated with the request will not cause oversubscription;
receive, when the admission condition is satisfied, a particular mapping of a copy of the first item of content; and
provide the copy of the first item of content to the user device.

14. The system of claim 13, where, when determining whether the admission condition is satisfied, the processor further is to:
determine an available capacity of a first storage component,
the first storage component including one or more of the respective elements of the resources associated with the first item of content.

15. The system of claim 14, where the available capacity of the first storage component includes an access capacity based on a maximum data readout rate of the first storage component.

16. The system of claim 14, where the first storage component includes one or more storage devices selected from at least one of:
a disk drive,
a solid-state memory, or
a non-volatile memory.

17. The system of claim 13, where the processor further is to:
store information associated with the particular schema in a first memory, the information including:
information associated with a plurality of mappings, each of the plurality of mappings being associated with each one of multiple instances of the first item of content stored in the resources of the storage environment.

18. The system of claim 17, where, when providing the particular mapping of the copy of the first item of content, the processor is further to:

evaluate the plurality of mappings, associated with the first item of content, based on particular criteria; and
select the particular mapping based on evaluating the plurality of mappings based on the particular criteria.

19. The system of claim 18, where the particular criteria is associated with an allocation of the resources of the storage environment.

20. The system of claim 13, where the access request includes at least one attribute associated with the first item of content.

21. The system of claim 20, where the particular mapping of the copy of the first item of content is based on the at least one attribute associated with the first item of content.

22. The system of claim 21, where the at least one attribute associated with the first item of content includes one or more of:
a file name of the first item of content,
a data length associated with the first item of content,
a data type of the first item of content, or
a universal resource identifier (URI) associated with the first item of content.

23. The system of claim 13, where the particular mapping is based on at least one of:
a measure of popularity of the first item of content,
a measure of resilience associated with the first item of content, or
a level of integrity associated with the first item of content.

24. The system of claim 13, where the particular mapping is further based on a statistical spread associated with elements of the resources of the storage environment.

25. A non-transitory computer-readable storage medium storing instructions, the instructions comprising:
one or more instructions which, when executed by a processor of a device, cause the processor to:
receive a request to upload a first item of content;
select, based on receiving the request, a particular schema, from a plurality of schemas, to use for storing the first item of content,
the particular schema being selected based on an anticipated demand for the first item of content, and the particular schema including:
first information identifying a quantity of stored copies of the first item of content, and
second information identifying an amount of bandwidth associated with accessing the first item of content;
store, based on selecting the particular schema, the first item of content on resources of a storage environment associated with the device;
receive, from a user device, a request for access to the first item of content;
identify, based on receiving the request for the access to the first item of content, the particular schema;
analyze a quantity of bandwidth allocated to one or more existing sessions associated with providing the first item of content;
determine whether an admission condition is satisfied based on the particular schema, a usage of the resources of the storage environment, and an availability of the resources of the storage environment,
the admission condition being satisfied based on determining, based on analyzing the quantity of bandwidth allocated to the one or more existing sessions associated with providing the first item of content, that a session associated with the request will not cause oversubscription;

receive, when the admission condition is satisfied, a particular mapping of a copy of the first item of content;

provide the copy of the first item of content to the user device.

\* \* \* \* \*

UNITED STATES PATENT AND TRADEMARK OFFICE
CERTIFICATE OF CORRECTION

| | | |
|---|---|---|
| PATENT NO. | : 9,176,779 B2 | Page 1 of 1 |
| APPLICATION NO. | : 12/170685 | |
| DATED | : November 3, 2015 | |
| INVENTOR(S) | : Gerovac et al. | |

It is certified that error appears in the above-identified patent and that said Letters Patent is hereby corrected as shown below:

In the claims

Claim 14

Column 13, lines 43-44, after "including" delete "one or more of the respective".

Signed and Sealed this
Fifteenth Day of March, 2016

Michelle K. Lee
*Director of the United States Patent and Trademark Office*